(12) United States Patent
Chen et al.

(10) Patent No.: US 11,451,430 B2
(45) Date of Patent: Sep. 20, 2022

(54) SYSTEM AND METHOD TO SCHEDULE MANAGEMENT OPERATIONS AND SHARED MEMORY SPACE FOR MULTI-TENANT CACHE SERVICE IN CLOUD

(71) Applicant: Huawei Cloud Computing Technologies Co., Ltd., Guizhou (CN)

(72) Inventors: Ming Chen, Markham (CA); Gui Fu, Markham (CA); Zhenhua Hu, Toronto (CA); Heng Kuang, Markham (CA); Shaohui Xu, Shenzhen (CN); Zhi Zhao, North York (CA)

(73) Assignee: Huawei Cloud Computing Technologies Co., Ltd., Guizhou (CN)

( * ) Notice: Subject to any disclaimer, the term of this patent is extended or adjusted under 35 U.S.C. 154(b) by 25 days.

(21) Appl. No.: 16/920,841

(22) Filed: Jul. 6, 2020

(65) Prior Publication Data

US 2020/0344110 A1 Oct. 29, 2020

Related U.S. Application Data

(63) Continuation of application No. PCT/CN2018/090152, filed on Jun. 6, 2018.

(51) Int. Cl.
*H04L 41/5022* (2022.01)
*H04L 67/568* (2022.01)
(Continued)

(52) U.S. Cl.
CPC ...... *H04L 41/0273* (2013.01); *G06F 9/45558* (2013.01); *H04L 41/0803* (2013.01);
(Continued)

(58) Field of Classification Search
CPC .............. G06F 9/45533–2009/45595; G06F 9/5061–5077; H04L 41/00–5096; H04L 67/568
See application file for complete search history.

(56) References Cited

U.S. PATENT DOCUMENTS 8,261,026 B2 * 9/2012 Klems ................. H04L 67/2847
711/148
8,701,109 B1 * 4/2014 Lazier ...................... G06F 8/63
718/1
(Continued)

FOREIGN PATENT DOCUMENTS

CN 102739771 A 10/2012
CN 104854567 A 8/2015
(Continued)

OTHER PUBLICATIONS

H. He, Z. Ma, H. Chen, D. Wu, H. Liu and W. Shao, "An SLA-Driven Cache Optimization Approach for Multi-tenant Application on PaaS," 2014 IEEE 38th Annual Computer Software and Applications Conference, 2014, pp. 139-148, doi: 10.1109/COMPSAC.2014.21. (Year: 2014).*
(Continued)

*Primary Examiner* — Glenton B Burgess
*Assistant Examiner* — Julian Chang
(74) *Attorney, Agent, or Firm* — Slater Matsil, LLP (57) ABSTRACT

Systems and methods for controlling management operations and shared memory space are disclosed. A cloud cache management controller may receive multiple sets of service attributes. Each set of the multiple sets of service attributes may be related to a cloud cache service instance. The cloud cache management controller may receive a first cloud cache management request. The cloud cache management request may comprise a cloud cache management operation. The cloud cache management controller may retrieve a set of
(Continued)

service attributes from the multiple sets of service attributes based on an evaluation of the cloud cache management operation. The cloud cache management controller may send the first cloud cache management request to a corresponding CCSI based on a priority value for the first cloud cache management request calculated based on the retrieved set of service attributes.

34 Claims, 6 Drawing Sheets

(51) Int. Cl.
    *H04L 41/0803*     (2022.01)
    *H04L 41/0273*     (2022.01)
    *G06F 9/455*     (2018.01)
    *G06F 9/50*     (2006.01)

(52) U.S. Cl.
    CPC ........ *H04L 41/5022* (2013.01); *H04L 67/568* (2022.05); *G06F 9/5005* (2013.01); *G06F 9/5072* (2013.01); *G06F 2009/45583* (2013.01)

(56) References Cited

U.S. PATENT DOCUMENTS

| | | | |
|---|---|---|---|
| 9,047,124 B2* | 6/2015 | Mehta | G06F 9/5027 |
| 9,098,214 B1* | 8/2015 | Vincent | G06F 8/10 |
| 9,134,980 B1* | 9/2015 | Cabrera | G06F 8/48 |
| 9,250,863 B1* | 2/2016 | Vincent | G06F 8/10 |
| 9,338,308 B1* | 5/2016 | Adams, Jr | G06Q 30/0203 |
| 9,413,819 B1* | 8/2016 | Berg | H04L 67/10 |
| 9,451,013 B1* | 9/2016 | Roth | H04L 47/76 |
| 9,569,475 B2* | 2/2017 | Hoang | G06F 12/084 |
| 9,639,546 B1* | 5/2017 | Gorski | G06F 16/172 |
| 9,672,054 B1* | 6/2017 | Gupta | G06F 9/45533 |
| 10,025,718 B1* | 7/2018 | Wasiq | G06F 11/3466 |
| 10,120,734 B1* | 11/2018 | Doraiswamy | G06F 9/541 |
| 10,176,033 B1* | 1/2019 | Wang | G06F 11/3055 |
| 10,459,750 B2* | 10/2019 | Zhang | G06F 8/65 |
| 10,628,394 B1* | 4/2020 | Gurspan | G06F 11/368 |
| 10,853,111 B1* | 12/2020 | Gupta | G06F 8/65 |
| 10,936,545 B1* | 3/2021 | Chockalingam | G06F 11/1448 |
| 10,972,355 B1* | 4/2021 | Bauer | H04L 41/0668 |
| 2006/0028979 A1* | 2/2006 | Levesque | H04L 41/0654 |
| | | | 370/229 |
| 2006/0056618 A1* | 3/2006 | Aggarwal | G06Q 10/0631 |
| | | | 380/1 |
| 2007/0123297 A1* | 5/2007 | Chan | H04M 1/72412 |
| | | | 455/550.1 |
| 2009/0046094 A1* | 2/2009 | Hamilton, II | G06F 3/04815 |
| | | | 345/419 |
| 2009/0046102 A1* | 2/2009 | Hamilton, II | G06T 15/20 |
| | | | 345/474 |
| 2009/0046109 A1* | 2/2009 | Hamilton, II | G06F 3/04815 |
| | | | 345/619 |
| 2009/0190475 A1* | 7/2009 | Chen | H04W 52/146 |
| | | | 370/236 |
| 2009/0316578 A1* | 12/2009 | Mang | H04L 47/70 |
| | | | 370/230 |
| 2010/0299553 A1* | 11/2010 | Cen | H04L 29/08729 |
| | | | 714/4.1 |
| 2010/0318575 A1* | 12/2010 | Murphy | G06F 11/1464 |
| | | | 707/802 |
| 2011/0069666 A1* | 3/2011 | Kahn | H04W 72/10 |
| | | | 370/329 |
| 2012/0191834 A1* | 7/2012 | Song | H04L 67/2842 |
| | | | 709/223 |
| 2012/0221768 A1* | 8/2012 | Bagal | G06F 12/084 |
| | | | 711/103 |
| 2012/0260256 A1* | 10/2012 | De Faria | G06F 9/5011 |
| | | | 718/103 |
| 2013/0013729 A1* | 1/2013 | Bennett | G06F 16/9574 |
| | | | 709/217 |
| 2013/0097680 A1* | 4/2013 | Bendapudi | H04L 67/1002 |
| | | | 726/6 |
| 2013/0159451 A1* | 6/2013 | Luciw | H04L 67/2842 |
| | | | 709/213 |
| 2013/0191842 A1* | 7/2013 | Sripathi Panditharadhya | G06F 9/5083 |
| | | | 718/105 |
| 2013/0208589 A1* | 8/2013 | Lopez Toledo | H04W 72/1263 |
| | | | 370/230 |
| 2013/0254325 A1* | 9/2013 | Song | G06F 16/24552 |
| | | | 709/213 |
| 2014/0013072 A1* | 1/2014 | Liu | G06F 9/5077 |
| | | | 711/170 |
| 2014/0067990 A1* | 3/2014 | Abdelhameed | G06F 16/972 |
| | | | 709/213 |
| 2014/0101237 A1 | 4/2014 | Chan et al. | |
| 2014/0136801 A1* | 5/2014 | Birkestrand | G06F 9/5077 |
| | | | 711/153 |
| 2014/0195689 A1* | 7/2014 | Gill | H04L 67/2833 |
| | | | 709/226 |
| 2014/0279329 A1* | 9/2014 | Dancel | G06Q 40/02 |
| | | | 705/35 |
| 2014/0280493 A1* | 9/2014 | Ortiz Rodriguez | H04L 67/2842 |
| | | | 709/203 |
| 2014/0310437 A1* | 10/2014 | Saund | G06F 13/36 |
| | | | 710/118 |
| 2014/0344471 A1* | 11/2014 | Valko | H04L 43/0852 |
| | | | 709/231 |
| 2014/0379409 A1* | 12/2014 | Giraldo | G06Q 10/10 |
| | | | 705/7.22 |
| 2015/0006733 A1* | 1/2015 | Khan | H04L 47/829 |
| | | | 709/226 |
| 2015/0074285 A1* | 3/2015 | Gahm | H04L 65/601 |
| | | | 709/231 |
| 2015/0154713 A1* | 6/2015 | Diaz | G06Q 40/08 |
| | | | 705/4 |
| 2015/0215791 A1* | 7/2015 | Geller | H04L 43/16 |
| | | | 455/446 |
| 2015/0257050 A1* | 9/2015 | Karimli | H04W 36/0061 |
| | | | 455/437 |
| 2016/0019147 A1* | 1/2016 | Vekiarides | G06F 12/0804 |
| | | | 711/122 |
| 2016/0019148 A1* | 1/2016 | Vekiarides | G06F 12/0897 |
| | | | 711/122 |
| 2016/0092803 A1* | 3/2016 | Boyacigiller | G06Q 10/067 |
| 2016/0170893 A1* | 6/2016 | Bhogal | G06F 9/45504 |
| | | | 711/118 |
| 2016/0173636 A1* | 6/2016 | Wang | H04L 67/2842 |
| | | | 709/213 |
| 2016/0269501 A1* | 9/2016 | Usgaonkar | H04L 67/2842 |
| 2016/0274929 A1* | 9/2016 | King | G06F 9/54 |
| 2016/0321288 A1* | 11/2016 | Malhotra | H04L 65/607 |
| 2016/0350091 A1 | 12/2016 | Khot et al. | |
| 2016/0378546 A1* | 12/2016 | Brouwer | G06F 9/4856 |
| | | | 718/1 |
| 2016/0378547 A1* | 12/2016 | Brouwer | G06F 9/4856 |
| | | | 718/1 |
| 2017/0046143 A1* | 2/2017 | Kochhar | G06F 8/60 |
| 2017/0078216 A1* | 3/2017 | Adolph | G06F 9/45558 |
| 2017/0124000 A1* | 5/2017 | Ash | G06F 12/123 |
| 2017/0249310 A1* | 8/2017 | Kumar | G06F 12/0813 |
| 2017/0289593 A1* | 10/2017 | Li | H04N 21/2408 |
| 2017/0308622 A1* | 10/2017 | Thornburgh | G06Q 50/163 |
| 2017/0344481 A1* | 11/2017 | Pack, III | G06F 16/00 |
| 2017/0344484 A1* | 11/2017 | Pack, III | G06F 12/128 |
| 2017/0351549 A1* | 12/2017 | Burke | G06F 9/5088 |
| 2017/0366606 A1* | 12/2017 | Ben-Shaul | G06F 3/064 |
| 2018/0004667 A1* | 1/2018 | Xiang | G06F 3/0611 |
| 2018/0007106 A1* | 1/2018 | Racz | H04L 65/60 |
| 2018/0019985 A1* | 1/2018 | Schoof | H04L 63/062 |
| 2018/0039628 A1* | 2/2018 | de Lavarene | G06F 9/5061 |
| 2018/0060182 A1* | 3/2018 | Rao Kotha | G06F 16/113 |
| 2018/0136960 A1* | 5/2018 | Zhang | G06F 8/65 |
| 2018/0137114 A1* | 5/2018 | Barbas | G06F 16/214 |
| 2018/0191550 A1* | 7/2018 | Vempati | H04W 76/45 |
| 2018/0249015 A1* | 8/2018 | Nakano | H04M 15/852 |

(56) References Cited

U.S. PATENT DOCUMENTS

| | | | |
|---|---|---|---|
| 2018/0300242 A1* | 10/2018 | Liu | G06F 12/0842 |
| 2018/0365036 A1* | 12/2018 | Toal | G06F 9/30047 |
| 2019/0065560 A1* | 2/2019 | Rojkov | G06F 16/2474 |
| 2019/0095253 A1* | 3/2019 | Curtis | H04L 41/5058 |
| 2019/0104030 A1* | 4/2019 | Giust | H04L 41/5022 |
| 2019/0130327 A1* | 5/2019 | Carpenter | G06F 9/45558 |
| 2019/0158354 A1* | 5/2019 | Zhou | H04L 41/0803 |
| 2019/0179755 A1* | 6/2019 | Mudumbai | G06F 12/0831 |
| 2019/0213230 A1* | 7/2019 | Lu | G06F 16/9538 |
| 2019/0310880 A1* | 10/2019 | Gupta | G06F 9/4856 |
| 2019/0378071 A1* | 12/2019 | Xu | G06Q 10/10 |
| 2020/0084121 A1* | 3/2020 | Matray | H04L 41/0896 |
| 2020/0159561 A1* | 5/2020 | Zhang | G06F 9/5088 |
| 2020/0358672 A1* | 11/2020 | Lange | H04L 67/1002 |
| 2022/0021590 A1* | 1/2022 | Seetharaman | H04L 41/5051 |

FOREIGN PATENT DOCUMENTS

| | | |
|---|---|---|
| CN | 106131158 A | 11/2016 |
| CN | 107346307 A | 11/2017 |
| CN | 107493327 A | 12/2017 |

OTHER PUBLICATIONS

M. Claeys et al., "Proactive multi-tenant cache management for virtualized ISP networks," 10th International Conference on Network and Service Management (CNSM) and Workshop, 2014, pp. 82-90, doi: 10.1109/CNSM.2014.7014144. (Year: 2014).*

Claeys, Maxim, et al. "Hybrid multi-tenant cache management for virtualized ISP networks." Journal of Network and Computer Applications 68 (2016): 28-41. (Year: 2016).*

Stefanovici, Ioan, et al. "Software-defined caching: Managing caches in multi-tenant data centers." Proceedings of the Sixth ACM Symposium on Cloud Computing. 2015. (Year: 2015).*

Y. Xiang, T. Lan, V. Aggarwal and Y.-F. Chen, "Optimizing Differentiated Latency in Multi-Tenant, Erasure-Coded Storage," in IEEE Transactions on Network and Service Management, vol. 14, No. 1, pp. 204-216, Mar. 2017, doi: 10.1109/TNSM.2017.2658440. (Year: 2017).*

* cited by examiner

SYSTEM AND METHOD TO SCHEDULE MANAGEMENT OPERATIONS AND SHARED MEMORY SPACE FOR MULTI-TENANT CACHE SERVICE IN CLOUD

This application is a continuation of International Patent Application No. PCT/CN2018/090152, filed on Jun. 6, 2018, which is hereby incorporated by reference in its entirety.

TECHNICAL FIELD

The present invention relates to the field of cloud computing, and, in particular embodiments, to a system and method for controlling management operations and shared memory space for cloud cache service.

BACKGROUND

Cloud computing is a form of network-based computing (e.g., Internet-based computing) that enables access to shared pools of configurable computing resources and higher-level services that can be rapidly provisioned with minimal management effort, often over the Internet. Cloud computing is another paradigm shift that follows the shift from mainframe based computing to client-server based computing that is implemented as services. Cloud computing service providers generally deliver three main types of services (referred to hereinafter as cloud computing services), infrastructure as a service (IaaS), platform as a service (PaaS), and software as a service (SaaS), by creating virtual machines on demand for use by customers. IaaS provides a computing infrastructure that can be rented and used by customers. The computing infrastructure comprises physical computing resources (e.g., processors, memory, storage, servers, networking components, etc.) that are virtualized and shared among customers. PaaS provides a platform that allows customers to develop, run, and manage software applications without having to build and maintain the computing infrastructure. SaaS provides software applications running on the computing infrastructure on demand over the Internet on a subscription basis. One type of PaaS provided by cloud service providers is a cloud caching service to provide in-memory data storage for software applications running on the computing infrastructure to shorten data access times, reduce latency, and improve input/output (IO) operations. Improvements to the performance of cloud caching services are desirable.

SUMMARY

Technical advantages are generally achieved by embodiments of this disclosure which describe a systems and method for controlling management operations and shared memory space for cloud cache service.

In accordance with embodiments, methods for controlling cloud cache management operations and shared memory space are disclosed. A cloud cache management controller may receive multiple sets of service attributes. Each set of the multiple sets of service attributes may be related to a cloud cache service instance. The cloud cache management controller may receive a first cloud cache management request. The cloud cache management request may comprise a cloud cache management operation. The cloud cache management controller may retrieve a set of service attributes from the multiple sets of service attributes based on an evaluation of the cloud cache management operation. The cloud cache management controller may send the first cloud cache management request to a corresponding CCSI based on a priority value for the first cloud cache management request calculated based on the retrieved set of service attributes.

Devices, as well as computer program products, for performing the methods are also provided.

BRIEF DESCRIPTION OF THE DRAWINGS

For a more complete understanding of the present invention, and the advantages thereof, reference is now made to the following description taken in conjunction with the accompanying drawings, in which.

DETAILED DESCRIPTION OF ILLUSTRATIVE EMBODIMENTS

The making and using of embodiments of this disclosure are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention. These and other inventive aspects are described in greater detail below.

The operating of the current example embodiments and the structure thereof are discussed in detail below. It should be appreciated, however, that the present disclosure provides many applicable inventive concepts that can be embodied in a wide variety of specific contexts. The specific embodiments discussed are merely illustrative of specific structures of the embodiments and ways to operate the embodiments disclosed herein, and do not limit the scope of the disclosure.

Cloud caching service is a PasS middleware service that is commonly used to enhance the performance for applications running on virtual machines instantiated in the cloud. Cloud caching service offers in-memory data storage, normally on cloud cache service nodes, for applications to access data at high speed. Cloud caching service must be able to respond to large volumes of concurrent requests for in-memory data storage while maintaining low latency and high throughput. Accordingly, cloud caching service has a high demand to enhance its performance and resource utilization. A system that provides a cloud caching service (referred to hereinafter as a cloud caching service system) often processes and responds to cloud cache management operations and cloud cache user operations. Cloud cache management operations generally relate to maintenance of the cloud caching service, such as backup, restore, and migration of data in a cloud cache. Cloud cache user operations relate access of cached data used by cloud applications.

Figure 1A:
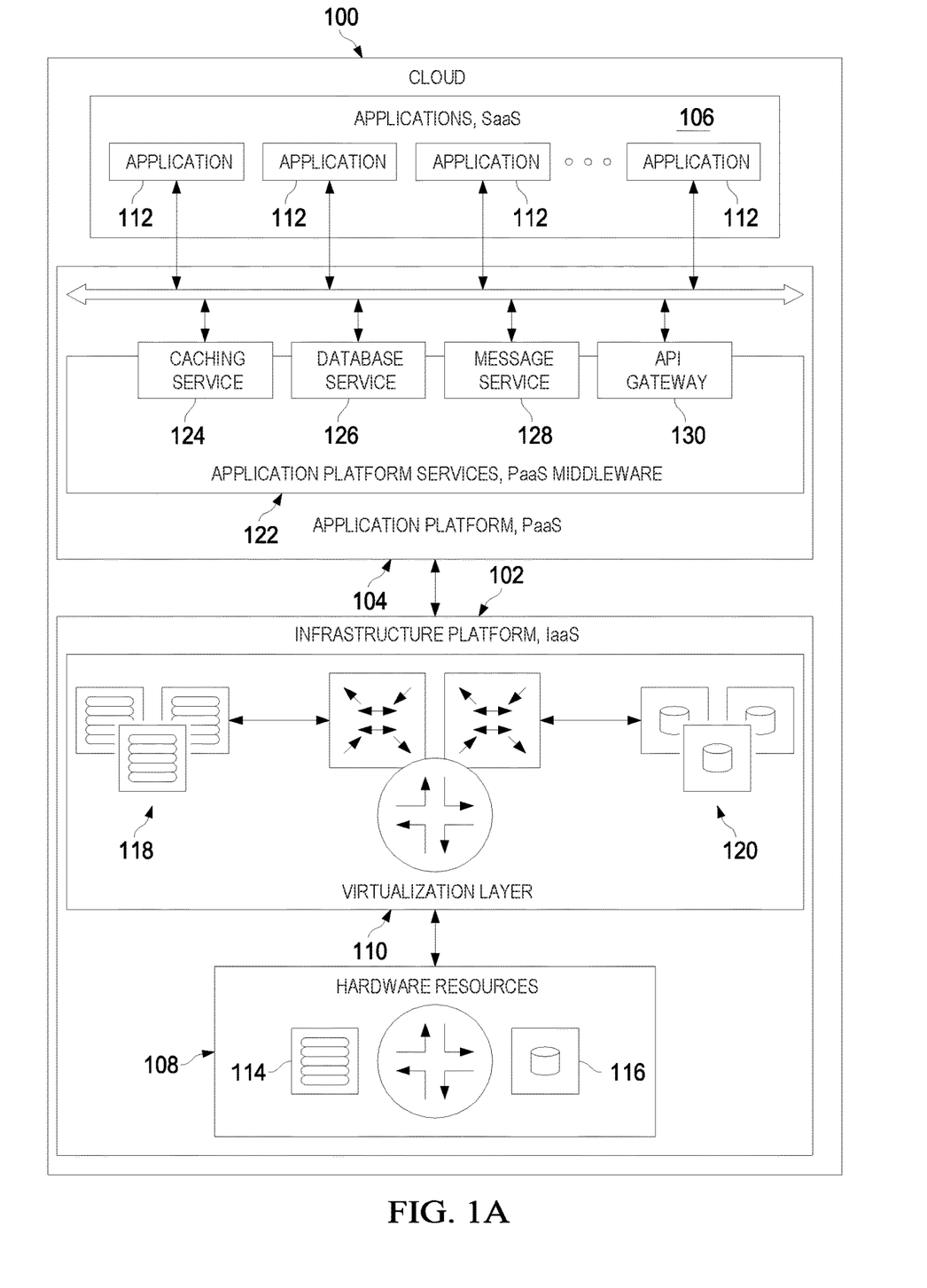
FIG. 1A is a logical block diagram illustrating a cloud computing architecture for delivering cloud computing services, according to some embodiments.

FIG. 1A is a logical block diagram schematically illustrating a cloud computing architecture that can deliver cloud computing services. The illustrated logical diagram of the cloud computing architecture 100 (referred to hereinafter as the cloud 100) generally comprises an infrastructure platform 102 (e.g., IaaS), an application platform 104 (e.g., PaaS), and applications 106 (e.g., SaaS). The infrastructure platform 102 comprises the physical hardware resources 108, and a virtualization layer 110 that presents an abstraction of the physical hardware resources 108 to the application platform 104. The abstraction presented by the virtualization layer 110 depends on the requirements of the applications 112 being hosted on the application platform 104. The physical hardware resources 108 include physical machines 114 (e.g., physical computing devices) that include physical processing resources (e.g., central processing units (CPUs), graphic processing units (GPUs), accelerators, tensor processing units (TPUs)). The physical hardware resources 108 also include physical storage 116 and networking resources (not shown) for connecting the physical machines 114 to the physical storage 116 to enable the physical machines 114 to access the physical storage 116. The physical storage comprises storage resources including memory (e.g., static random access memory (SRAM), dynamic random access memory (DRAM), synchronous DRAM (SDRAM), read-only memory (ROM), persistent storage (e.g., hard disk drives, solid state drives, optical drives, and the like), and combinations thereof. The physical hardware resources 108 are generally resident within a data center. A data center, as will be understood in the art, includes a collection of the processing, storage, and network resources of the physical hardware resources 108 (typically in the form of servers) that can be used as a collective computing resource. Within a data center, a plurality of servers can be connected together to provide a computing resource pool upon which virtualized entities can be instantiated. Data centers can be interconnected with each other to form pools of computing resources connected to each by connectivity resources. The connectivity resources may take the form of physical connections such as Ethernet or optical communications link.

The virtualization layer 110 supports a flexible and efficient multi-tenancy run-time and hosting environment for applications 112 by providing Infrastructure as a Service (IaaS) facilities. The virtualization layer 110 includes a virtualization manager or hypervisor (not shown) that may provide a security and resource "sandbox" for each application 112 being hosted by the application platform 104. Each "sandbox" may be implemented as a Virtual Machine (VM) 118 (e.g., virtual computing device) that may include an appropriate operating system and controlled access to a set of virtual computing resources, such as virtualized processing resources, storage resources (e.g. virtual storage 120), and networking resources.

The virtualization of the physical hardware resources 108 by the virtualization layer 110 is considered to be foundational technology for the cloud 100. Virtualization of is a technology that allows for the creation of virtual computing resource pools of computing resources (e.g., processing, storage, and networking resources) connected to each by connectivity resources. Virtualization may take the form of instantiating VMs 118 that, to another entity on a network and to software executed on the VM 118, is no different than a physical computing device. A VM 118 has its own set of computing resources (e.g., processing, storage, and connectivity resources), upon which an operating system can be executed. The VM 118 can have a virtual network interface that can be assigned a network address. Between the underlying resources and the VM 118, there is typically a hypervisor (not shown) that manages the resource isolation and network interactions. One of the purposes of a VM 118 is to provide isolation from other processes running on the cloud 100. When initially developed, a VM 118 was a mechanism to allow different processes to operate without concern that a single errant process would be able to cause a complete system crash. Instead, an errant process would be contained to its own VM 118. This isolation allows for each VM 118 to have its own set of network interfaces. Typically, a single underlying computing resource can support a plurality of virtualized entities.

It will be appreciated by those skilled in the art that a more recent development has been the use of containers in place of VMs 118. As mentioned above, each VM 118 typically includes its own operating system which typically increases redundant computing, storage, and connectivity resource usage. Containers allow a single OS kernel to support a number of isolated applications. In place of a hypervisor that allows each VM 118 to run its own OS, a single OS hosts containers that are responsible for enforcing the resource isolation that would otherwise be provided by the VM 118.

The application platform 104 provides the capabilities for hosting applications 112 and includes application platform services 122. The application platform services 122 provide a set of middleware application services and infrastructure services to the applications 112 hosted on the application platform 104. In the embodiment depicted in FIG. 1A, the application platform services 122 include a cloud caching service system 124 for in-memory data storage, a database service 126 for applications, a message service 128 for publishing messages to subscriber customers, and an application program interface (API) gateway service 130 that enables clients to create, publish, and maintain application program interfaces (APIs) to access other cloud services. It will be appreciated by those skilled in the art that the application platform services 122 may provide other middleware application services to customers, such as notification services, run-time services, and the like. Applications 112 from clients may be deployed and executed within a respective VM 118 or physical machine 114. Applications provided by SaaS and hosted by the application platform 104 may run within a respective VM 118 or a physical machine 114.

Figure 1B:
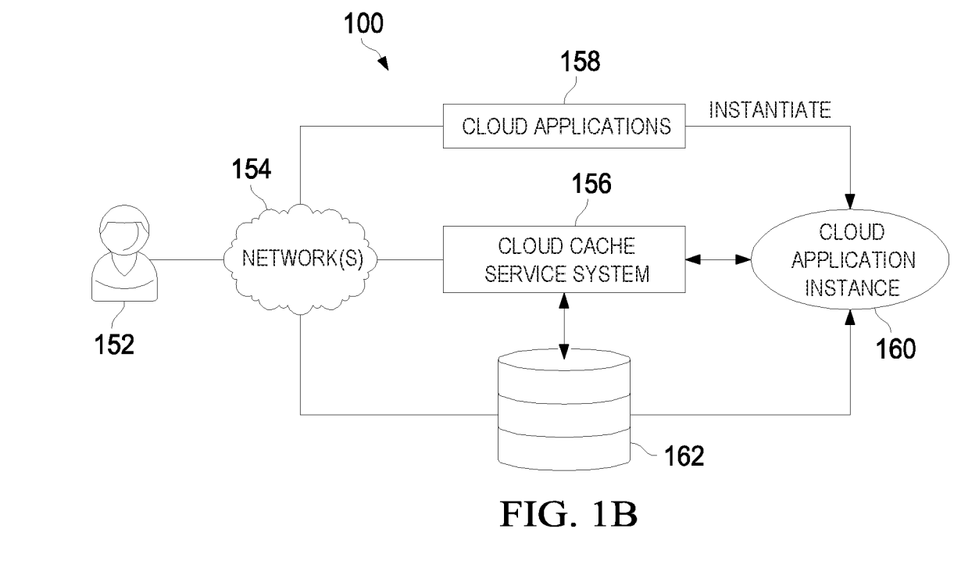
FIG. 1B is a diagram of a cloud cache service system of a cloud computing architecture for delivering cloud cache services, according to some embodiments.

FIG. 1B illustrates a diagram of a cloud caching service system 124 of the cloud 100, according to some embodiments. In FIG. 1B, a user 152 of a client device may access and use one or more cloud applications running in the cloud 100 via one or more networks 154. One or more networks 154 may be a wired and/or wireless network, and may include any combination of LANs, WANs, the Internet, etc.

A cloud application 158, or cloud app, is a software application that that is deployed and executed on a virtual machine of the cloud 100 or an instance of an application 112 provided by the SaaS and hosted by application platform 104 of the cloud 100. Cloud applications 158 are a blend of standard web or mobile applications and conventional desktop applications. A cloud application 158 is a software program where cloud-based/server-side components and local/client-side components of the application work together. Examples of cloud applications 158 may include, but are not limited to, web based word processing programs and web based spreadsheet applications. The model of cloud applications relies on remote servers resident in a data center for the processing logic and data that is accessed through a local client web browser with a continual reliable network connection. Cloud applications 158 do not require large amounts of storage in the user's client device. If the client device associated with the user 152 has a fast Internet connection, an efficient cloud application can offer the interaction of a local/client-side application together with the portability of a web application. For example, a client device associated with user 152 may provide a web browser and an Internet connection that can easily allow user 152 access and use the cloud applications 158, through a local graphical user interface (not shown in FIG. 1B) rendered on a display of the client device (not shown in FIG. 1B).

When the client device associated with user 152 accesses and uses one of the cloud applications 158, the application platform 104 may instantiate a corresponding instance of a cloud application (referred to hereinafter as a cloud application instance 160) for that cloud application. For example, if a user 152 uses a web browser or mobile application of a client device to open a word document, a cloud application instance 160 of a cloud application (e.g., a cloud-based word processing application) provided by the SaaS is instantiated in the cloud 100 to process the word document. Cloud application instance 160 may fetch or modify data associated with the word document, which is permanently stored in database 162 provided by the database service 126. Database 162 may be instantiated on one or more physical hardware resources 108 of the cloud 100.

Fetching and/or modifying data in database 162 requires access to the physical hardware resources 108 (e.g., physical storage resources) used by database 162. Accessing physical hardware resources 108 (e.g., physical storage resources) can be slow. To improve the response time, the cloud 100 generally includes a cloud cache service system 156 for providing a cloud caching service 124. A cache is a high-speed data storage which stores a subset of data, typically transient in nature, so that future requests for that data can be retrieved from the cache faster than it is possible by retrieving the data from the physical storage resources of the physical hardware resources 108. In one example, cloud cache service system 156 may provide managed, in-memory data store and caching service that enables hosted and managed cloud applications to retrieve and modify data faster (e.g., in less time) than retrieving and modifying data from database 162.

Data in cache service system 156 is generally stored in fast access physical hardware resources, such as RAM (random-access memory), which is faster but has smaller storage capacity than the physical storage resources the database 162 is instantiated on. Some non-limiting examples of cache service system 156 may include Amazon ElastiCache, Microsoft Azure Redis Cache, Google Memcache, IBM Compose for Redis, and Alibaba ApsaraDB for Redis. Data in cache service system 156 may be used in correlation with instances of cloud applications, such as cloud application instance 160. The primary purpose of cache service system 156 is to increase data retrieval performance by reducing the need to access the underlying slower physical storage resources the database 162 is instantiated on. In contrast, the larger physical storage resources the database 162 is instantiated on stores data that is usually complete and durable.

Figure 2:
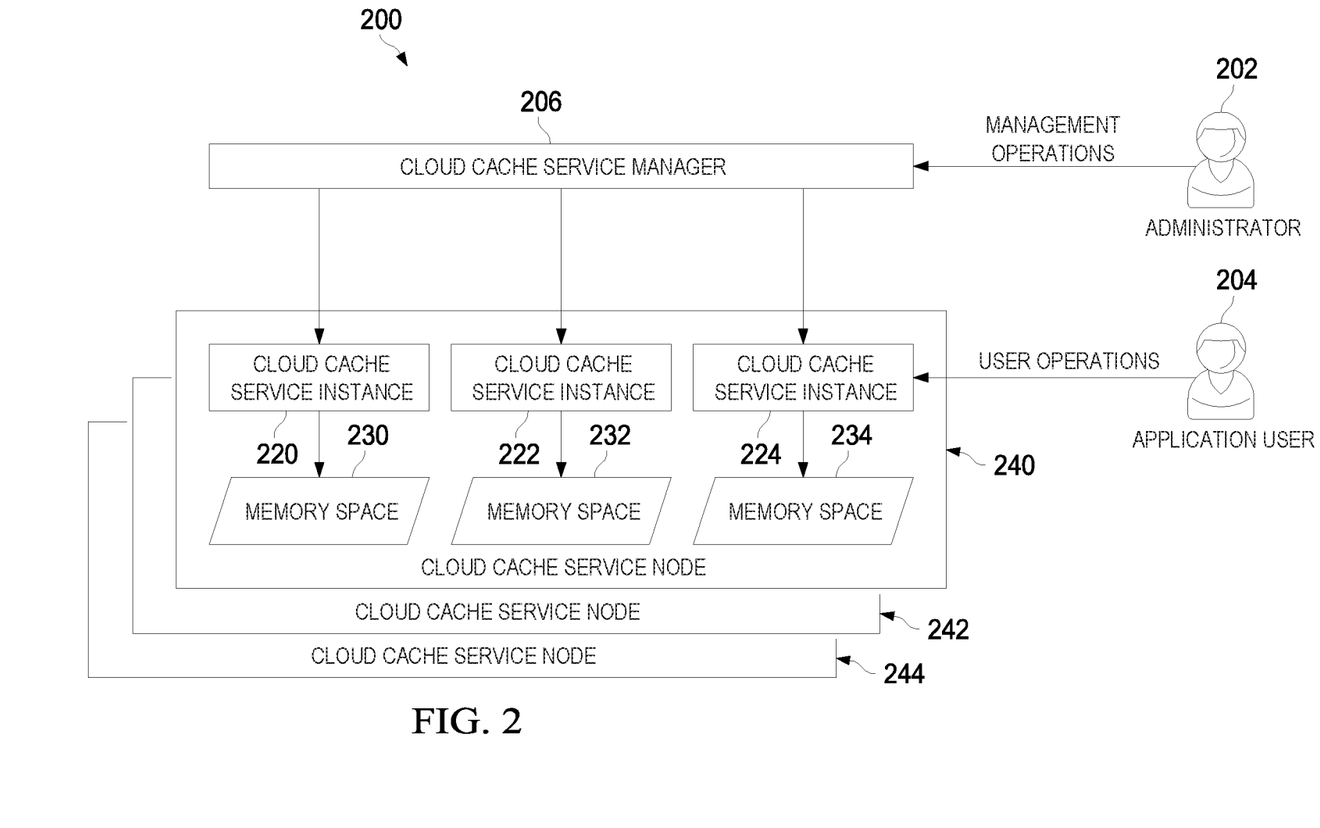
FIG. 2 is a diagram of a conventional cloud cache service system.

FIG. 2 illustrates a diagram of a conventional cloud cache service system 200. Cloud cache service system 200 in FIG. 2 may be an example of cloud cache service system 156 in FIG. 1B. Cloud cache service system 200 includes cloud cache service manager (CCSM) 206 and cloud cache service nodes 240, 242, and 244. For simplicity of illustration, FIG. 2 shows three cloud cache service nodes. However, cloud cache service system 200 may include any number of cloud cache service nodes.

Each cloud cache service node includes one or more cloud cache service instances (CCSIs). For example, cloud cache service node 240 includes cloud cache service instances 220, 222, and 224. For simplicity of illustration, FIG. 2 shows three cloud cache service instances in cloud cache service node 240. However, a cloud cache service node may have any number of cloud cache service instances. Each cloud cache service instance is associated with and used by an instance of a cloud application 158. For example, a cloud application user 204 may use a web browser or mobile application of a client device to interact with a cloud-based word processing application provided by the SaaS and hosted by the application platform 104 of the cloud 100 to open a word document. The application platform 104 of the cloud 100 may instantiate a cloud application instance, such as cloud applicant instance 160 in FIG. 1B. The cloud application instance (not shown in FIG. 2) is associated with one of the cloud cache service instances. For example, the cloud application instance may be associated with cloud cache service instance 224. Each cloud cache service instance may have its own separate memory space. In the example illustrated in FIG. 2, cloud cache service node 240 includes three separate memory spaces 230, 232, and 234. Cloud cache service instances 220, 222, and 224 are associated with memory spaces 230, 232, and 234, respectively.

When the cloud application user 204 uses a web browser or mobile application of a client device to read or edit the word document, cloud cache user operations (e.g., related to fetching or modifying cached data) are sent to the cloud cache service instance associated with the cloud application instance, which will locate the memory space associated with the cloud cache service instance.

Cloud cache service system may also process cloud cache management operations through cloud cache service manager 206. Cloud cache service manager 206 may run on one or more physical machines 114 or one or more VMs 118 of the cloud 100. Cloud cache service manager 206 may receive cloud cache management operations from cloud administrator 202. Cloud cache service manager 206 may then send the cloud cache management requests containing the cloud cache management operations to corresponding one or more cloud cache service instances. Examples of cloud cache management operations include, but are not limited to backup, restore, and migration of cached data. For example, cloud administrator user 202 may want to backup data associated with cloud cache service instances 222 and 224. After cloud cache service manager 206 receives the requests for such cloud cache management operations, cloud cache service manager 206 may forward the requests to cloud cache service instances 222 and 224 to start the backup process.

In conventional cloud cache service systems, there is no appropriate coordination among cloud cache user operations, cloud cache management operations, and service attributes of cloud cache service instances. The performance (e.g., response time) of cloud cache user operations could get seriously impacted by cloud cache management operations because cloud cache management operations often require operating on a huge amount of data (e.g., backup, restore, or migration). In addition, different cloud cache service instances in a cloud cache service node have their own separate memory spaces to handle concurrent requests from cloud cache management operations and cloud cache user operations. The approach of a separate memory space for each individual cloud cache service instance does not efficiently utilize memory resources on a cloud cache service node.

For example, there are several technical limitations related to the conventional cloud cache service system 200 illustrated in FIG. 2. The first technical issue is that cloud cache management operations (e.g., backup, restore, migration) may impact the performance of cloud cache user operations. User operations are associated with the cloud application users' use of cloud applications. Many cloud applications, such as cloud-based word processing programs or spreadsheet applications, require real-time interaction with the users of the cloud applications. Thus, the performance and response time of the cloud cache service system are crucial to cloud applications. In addition, in the cloud 100, many multi-tenant services may be hosted in a single physical node that shares its resources, such as a part of the physical hardware resources 108 provided by the single physical node. A multi-tenant service refers to a software service that runs on a physical node and serves multiple tenants. A tenant may be a group of users who share a common access with specific privileges to the software instance. With a multitenant architecture, a software application is designed to provide every tenant a dedicated share of the instance, including its data, configuration, user management, and tenant individual functionality. Although physical hardware resources 108 may be provided by many physical nodes in the cloud 100, some tenants may share some of the physical hardware resources 108 provided by a single physical node. In this aspect, cloud cache service instances from multiple tenants impact the performance for these tenants on each other. In addition, cloud cache management operations can be resource intensive. For instance, a backup cache management operation may request backup of 100 gigabytes of cached data. Without proper coordination between cloud cache management operations and cloud cache user operations, the performance of cloud cache user operations can be significantly hindered by the resource demanding cloud cache management operations.

The second technical issue is resource utilization efficiency. As illustrated in FIG. 2, each cloud cache service instance has its own memory space. To handle current cloud cache management operations and cloud cache user operations, cloud cache management operations for multiple cloud cache service instances require multiple copies of system swap memory (one per cloud cache service instance). For example, a cloud cache service instance is in the read-only mode while the cloud cache service instance is performing the backup. Consequently, the writing request of cloud cache user operations from the client devices associated with cloud application users may be temporarily redirected to the swap memory. When the backup is completed, the cached data in the swap memory may be written back to the cloud cache service instance. However, having one memory space per cloud cache service instance is not an efficient solution in terms of resource utilization.

Accordingly, technical solutions are needed for improving performance and enhance resource utilization of a cloud cache service system.

To solve the above technical problems, embodiments of this disclosure provide a technical solution in which a cloud cache service system includes a cloud cache service controller (CCSC) between the cloud cache service manager (CCSM) and cloud cache service instances (CCSIs) on one or more cloud cache service nodes. The cloud cache service controller controls management operations. After receiving a cloud cache management request, the cloud cache service controller may evaluate the cloud cache management operation in the cloud cache management request. The cloud cache service controller may calculate a priority value based on associated service attributes dimensions/levels. The cloud cache service controller then uses the calculated priority value to determine how to control and forward the cloud cache management request including the cloud cache operation to the corresponding cloud cache service instance. By controlling the cloud cache management operations, the cloud cache service controller improves the performance of cloud cache user operations because cloud cache user operations are not impacted by the cloud cache management operations. In addition, the controlling offered by the cloud cache management controller allows different cloud cache service instances in the same cloud cache service node to share the same shared memory space, which results in more efficient utilization of memory resources on the cloud cache service nodes.

Figure 3:
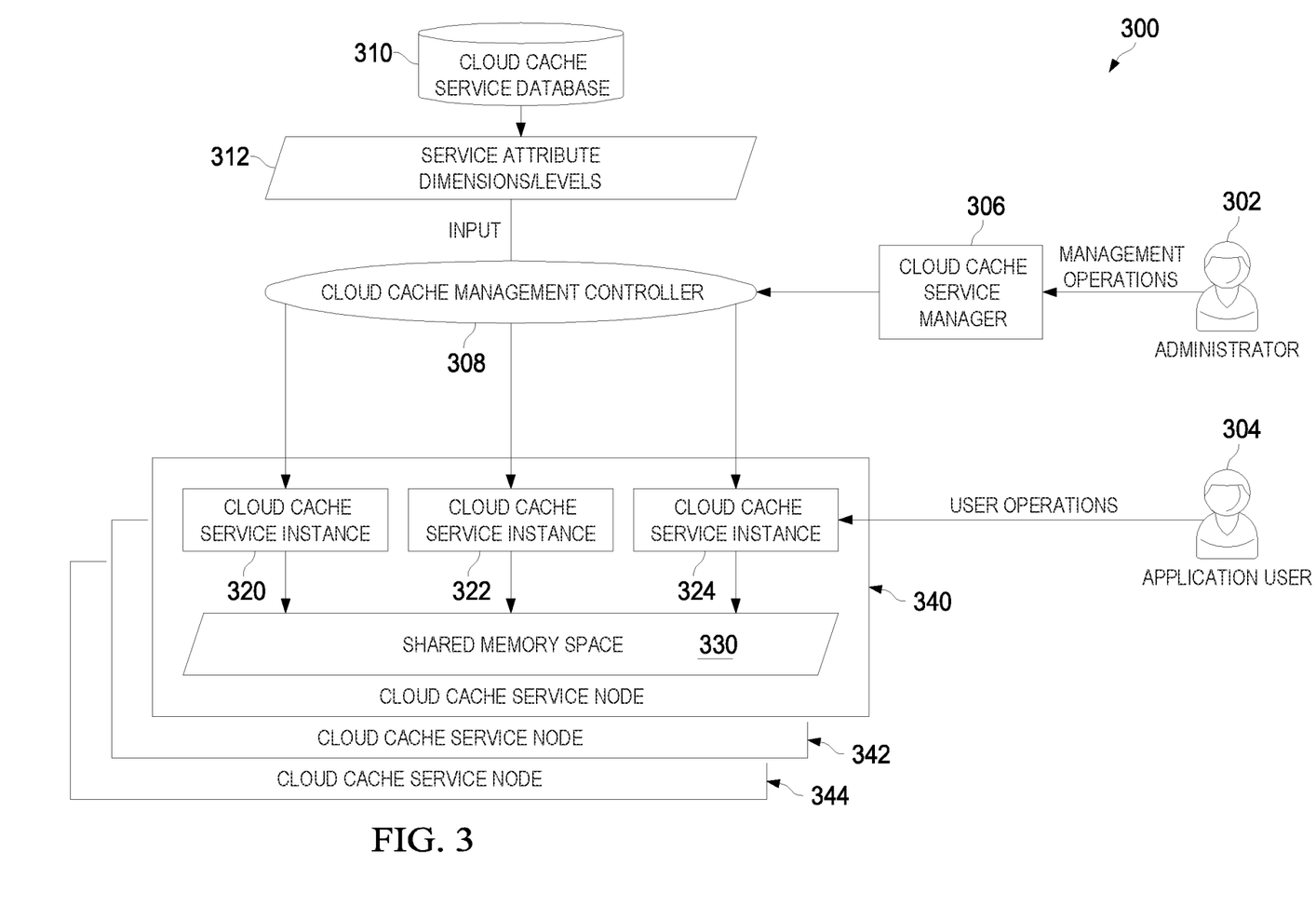
FIG. 3 is a diagram of a cloud cache service system using a cloud cache management controller (CCMC), according to some embodiments.

FIG. 3 illustrates a diagram of a cloud cache service system 300 utilizing a cloud cache management controller (CCMC) for controlling management operations and shared memory space in the cloud, according to some embodiments. Cloud cache service system 300 in FIG. 3 may be another example of cloud cache service system 156 in FIG. 1B. Cloud cache service system 300 includes cloud cache service manager (CCSM) 306, cloud cache management controller (CCMC) 308, cloud cache service database 310, and cloud cache service nodes 340, 342, and 344. For simplicity of illustration, FIG. 3 shows three cloud cache service nodes. However, cloud cache service system 300 may include any number of cloud cache service nodes. Each cloud cache service node includes one or more cloud cache service instances (CCSIs). For example, cloud cache service node 340 includes cloud cache service instances 320, 322, and 324. For simplicity of illustration, FIG. 3 shows three cloud cache service instances in cloud cache service node 340. However, a cloud cache service node may have any number of cloud cache service instances. Each cloud cache service instance is associated with and used by an instance of a cloud application. For example, a cloud application user 304 may use a web browser or mobile application of a client device to interact with an instance of a cloud-based word processing application provided byer the SaaS and hosted by the application platform 104 to open a word document, such as cloud applicant instance 160 in FIG. 1B. The cloud application instance (not shown in FIG. 3) is associated with one of the cloud cache service instances. For example, the cloud application instance may be associated with cloud cache service instance 324. In contrast to the conventional cloud cache service system 200 depicted in FIG. 2, all the cloud cache service instances in the same cloud cache service node may share a same shared memory space (SMS). In the example illustrated in FIG. 3, cloud cache service node 340 has one shared memory space 330 used and shared by cloud cache service instances 320, 322, and 324.

When cloud application user 304 uses a web browser or mobile application of a client application to access a word processing application running in the cloud 100 to perform certain operations on the word document, such as document viewing or document editing operations, cloud cache user operations (e.g., related to fetching or modifying cached data) are sent to the cloud cache service instance associated with the cloud application instance, which will located the shared memory space 330.

Cloud cache service manager 306 may run on one or more physical machines 114 or one or more VMs 118 of the cloud 100. Cloud cache service manager 306 may receive cloud cache management operations from administrator 302. Examples of cloud cache management operations include, but are not limited to backup, restore, and migration of cached data.

In contrast to the conventional loud cache service system 200 illustrated in FIG. 2, cloud cache service system 300 in FIG. 3 includes cloud cache management controller 308 between cloud cache service manager 306 and cloud cache service instances in cloud cache service nodes 340, 342, and 344. In one embodiment, cloud cache management controller 308 and cloud cache service manager 306 may run on the same physical machines 114 or VMs 118 of the cloud. In another embodiment, cloud cache management controller 308 and cloud cache service manager 306 may run on different physical machines 114 or VMs of the cloud 100. After cloud cache service manager 306 receives cloud cache management operations from cloud administrator user 302, cloud cache service manager 306 sends the cloud cache management requests containing the cloud cache management operations to cloud cache management controller 308. Rather than immediately forwarding the cloud cache management operations to corresponding cloud cache service instances, cloud cache management controller 308 may first evaluate the cloud cache management operations in the cloud cache management requests. Then, cloud cache management controller 308 may determine how to control and forward the cloud cache management operations based the evaluation.

Cloud cache management controller 308 may evaluate a cloud cache management operation in a cloud cache management request based on the type of the cloud cache management operation. For example, cloud cache management controller 308 may retrieve a set of service attribute dimensions/levels associated with the type of the cloud cache management operation. All the service attribute dimensions/levels may be permanently stored in cloud cache service database 310. Before receiving any cloud cache management operation, cloud cache management controller 308 may collect all the service attribute dimensions/levels 312 from cloud cache service database 310. In one example, cloud cache management controller 308 may collect all the service attribute dimensions/levels 312 from cloud cache service database 310 at the startup time. In addition, cloud cache management controller 308 may periodically send collection requests to cloud cache service database 310 so that cloud cache management controller 308 may receive the most recent updates about the attribute dimensions/levels.

Cloud cache service system 300 has multiple dimensions, which are used for describing different service-level agreements (SLAs) for the cloud caching service 124. An SLA may have a functional requirement, which defines a function of the system or its components. A function may be described as a set of inputs, the behavior, and the outputs. An SLA may also have a non-functional requirement, which specifies criteria that can be used to judge the operation of the system, rather than specific behaviors. The system refers to a computer system (e.g., software and/or hardware) in terms of defining functional/non-functional requirements. The system may be the cloud caching system 300 or a cloud system based on the cloud computing architecture 100.

Examples of dimensions include, but are not limited to, service plans for the application platform services 122, including the cloud caching service 124, time elapse entering the next maintenance time, time elapse exiting from the previous maintenance time, operation execution length projection, resource consumption projection. Each dimension may be assigned a weight. The total weight added up for all the dimensions in the system is 100%. For example, the system may have three dimensions. The dimension for service plans may have a weight of 60%, the dimension for time elapse entering the next maintenance time may have a weight of 30%, and the dimension for time elapse exiting may have a weight of 10%.

Each dimension may have one or more levels. A level may have a rank. In one example, the rank may range from 1 to 10. The higher the rank is, the higher the SLA is assigned to a dimension. For example, the system may have three levels of service plans. Level 1 is for a VIP customer plan. Level 2 is for a dedicated customer plan. Level 3 is for a pay-as-you-go customer plan. Different ranks may be assigned to different service plans to indicate the relative importance of one service plan with respect to other service plans. For example, the rank for the VIP customer plan may be 10. The rank for the dedicated customer plan may be 6. The rank for the pay-as-you-go customer plan may be 3.

Based on the retrieved service attribute dimensions/levels, cloud cache management controller 308 may calculate a priority value for a cloud cache management operation. Cloud cache management controller 308 uses the priority value to determine how to control and forward the cloud cache management request to one or more corresponding cloud cache service instances. The priority value may be an overall rank calculated based on the weight and one or more levels associated with each dimension of the dimensions. For example, if there are N dimensions, and each dimension has one level. The priority value may be calculated based on the following.

$$\text{Priority Value} = \text{Dimension}_1.\text{level} * \text{Weight}_1 + \text{Dimension}_2.\text{level} * \text{Weight}_2 + \ldots + \text{Dimension}_N.\text{level} * \text{Weight}_N.$$

In the above example, $\text{Dimension}_i.\text{level}$ represents the rank of the level for $\text{Dimension}_i$, and $\text{Weight}_i$ represents the weight associated with $\text{Dimension}_i$.

When a dimension has multiple levels, the rank for each level may be considered for calculating the priority value. For example, if there are N dimensions, and each dimension has one level except that the first dimension has two levels. The priority value may be calculated based on the following.

$$\text{Priority Value} = \text{Dimension}_1.\text{level}_1 * \text{Weight}_1 + \text{Dimension}_1.\text{level}_2 * \text{Weight1} + \text{Dimension2}.\text{level}*\text{Weight}_2 + \ldots + \text{Dimension}_N \text{level}*\text{Weight}_N.$$

In the above example, $\text{Dimension}_i$ level represents the rank of the level for $\text{Dimension}_i$ (except $\text{Dimension}_1$), and $\text{Weight}_i$ represents the weight associated with $\text{Dimension}_i$. In addition, $\text{Dimension}_1$ $\text{level}_1$ represents the rank of the first level for $\text{Dimension}_1$, and $\text{Dimension}_1.\text{level}_2$ represents the rank of the second level for $\text{Dimension}_1$.

After calculating the priority value, cloud cache management controller 308 may determine how to control the cloud cache management operation based on the priority value.

For example, cloud cache management controller 308 may delay forwarding the cloud cache management operation to a corresponding cloud cache service instance until the next maintenance time window. In another non-limiting example, cloud cache management controller 308 may calculate priority values for multiple cloud cache management operations and reorder the cloud cache management operations. Cloud cache management controller 308 may forward a cloud cache management operation with a higher priority value before forwarding another cloud cache management operation with a lower priority value.

Figure 4:
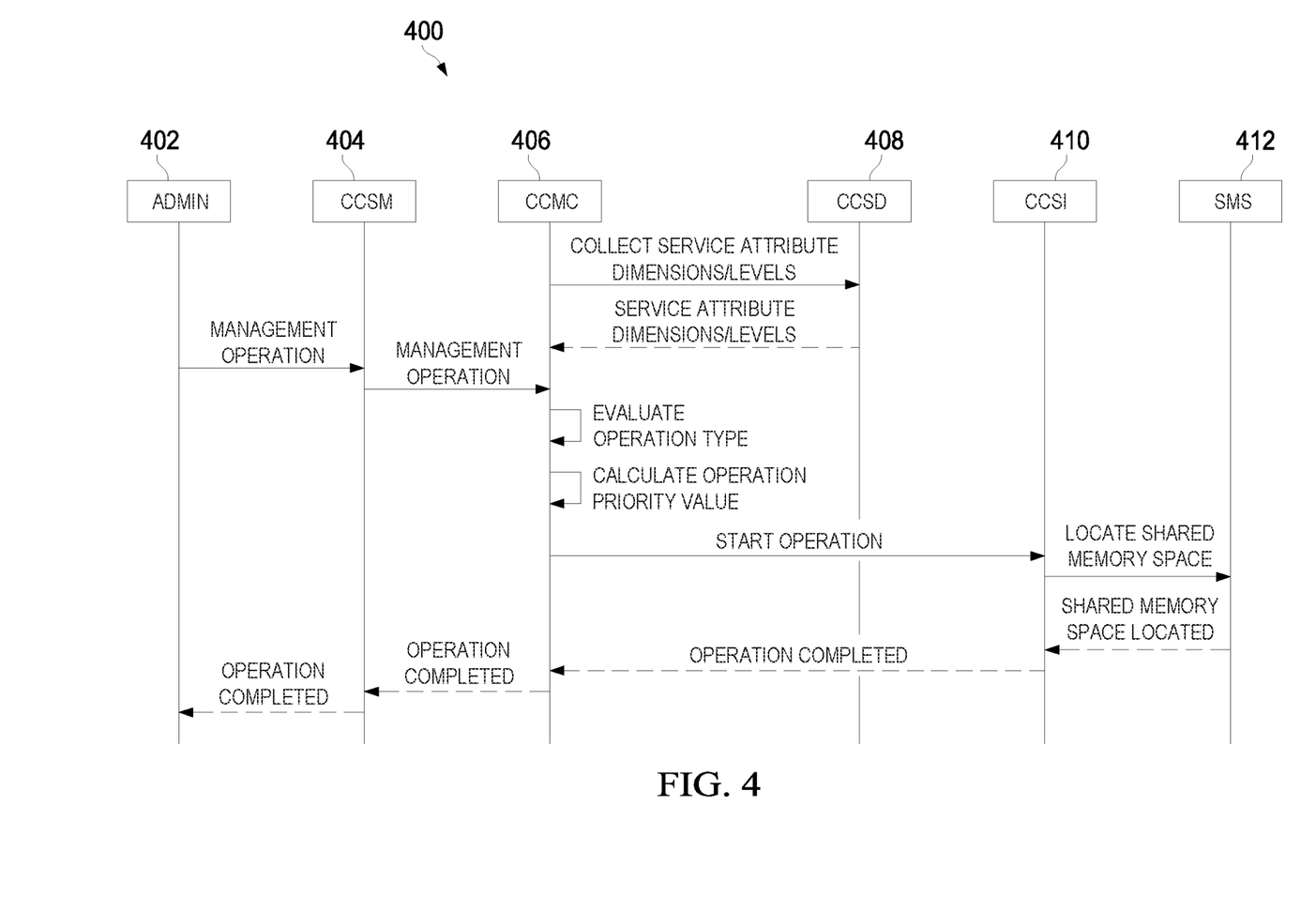
FIG. 4 is a diagram of a message flow for a cloud cache service system to utilize a cloud cache management controller, according to some embodiments.

FIG. 4 illustrates a diagram of message flow 400 for a cloud cache service system utilizing a cloud cache management controller, according to some embodiments. Cloud cache management controller (CCMC) 406 first sends a collection request to cloud cache service database (CCSD) 408 to collect information about service attribute dimensions/levels. CCSD 408 may permanently store the information about all the service attribute dimensions/levels. In one embodiment, CCMC may send the collection request to collect information about all the service attribute dimensions/levels stored in CCSD 408. Then, CCMC 406 receives a collection response from CCSD 408. The collection response includes information about the requested service attribute dimensions/levels. CCMC 406 may initially collect service attribute dimensions/levels before receiving any cloud cache management request. In addition, CCMC 406 may periodically send collection requests to CCSD 408 so that CCMC 406 may receive the most recent updates about the attribute dimensions/levels.

To trigger a cloud cache management operation, such as backup, restore, or migration, an administrator may use a graphical user interface on her/his administration computing device 402 for initiating the cloud cache management operation. In another embodiment, the management operation may be initiated automatically by a cloud cache management software program running on administration computing device 402, without any user interaction. The administration computing device 402 then sends a cloud cache management request including the cloud cache management operation to cloud cache service manager (CCSM) 404. Rather than directing forwarding the management request to the corresponding cloud cache service instance (CCSI) 410, CCSM 404 forwards the cloud cache management request including the cloud cache management operation to cloud cache management controller (CCMC) 406.

After CCMC 406 receives the cloud cache management request from CCSM 404, CCMC 406 evaluates the cloud cache management request to determine the management operation type of the cloud cache management operation in the cloud cache management request. A management operation type may be, but not limited to, one of a backup, restore, or migration. Based on the management operation type, CCMC 406 calculates a priority value for the cloud cache management operation. For example, CCMC 406 may retrieve a set of service attribute dimensions/levels associated with the type of the cloud cache management operation. The priority value may be an overall rank that CCMC 406 calculates based on the weight and one or more levels associated with each dimension of the dimensions in the retrieved set of service attribute dimensions/levels.

After calculating the priority value, CCMC 406 uses the priority value to determine how to control and forward the cloud cache management request to CCSI 410. CCMC 406 may delay until a next maintenance time window to forward the cloud cache management request to CCSI 410 based on the calculated priority value. In another embodiment, CCMC 406 may receive multiple cloud cache management requests including multiple cloud cache management operations for one or more CCSIs. CCMC 406 may calculate a priority value for each of the multiple cloud cache management operations. CCMC 406 then reorder the multiple cloud cache management requests based on the calculated priority values and forward the multiple cloud cache management requests based on the reordering.

CCMC 406 sends a cloud cache management request to CCSI 410, and the cloud cache management request indicates to CCSI 410 to start the cloud cache management operation included in the cloud cache management request. Based on the cloud cache management operation, CCSI 410 locates shared memory space (SMS) 412. After locating SMS 412, CCSI 410 performs the cloud cache management operation. Afterwards, CCSI sends an operation completion response back to CCMC 406 to indicate that the requested cloud cache management operation has been successfully completed. Then, CCMC 406 forwards the operation completion response back to CCSM 404, which in turn sends the operation completion response to administration computing device 402.

Figure 5:
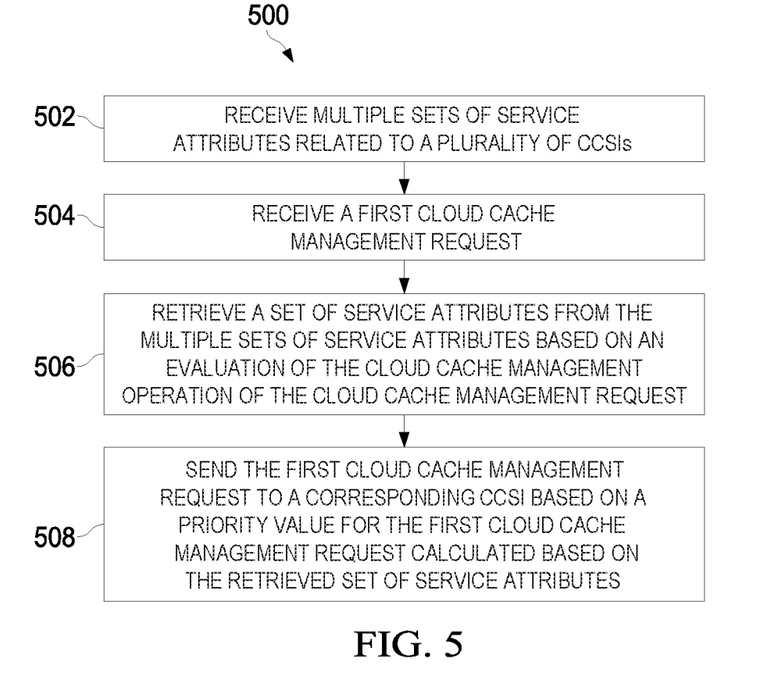
FIG. 5 is a flowchart of a method for controlling management operations and shared memory space for cache service in the cloud, according to some embodiments.

FIG. 5 illustrates a flowchart of method 500 for controlling management operations and shared memory space in the cloud 100, according to some embodiments. Method 500 may be carried out or performed by a cloud cache management controller, such as cloud cache management controller 308 in FIG. 3 and CCMC 406 in FIG. 4. The cloud cache management controller may include routines, subroutines, or modules of software which when executed by one or more physical machines 114 or one or more VMs 118 of the cloud 100 causes the cloud cache management controller to carry out or perform method 500. Coding of the software is well within the scope of a person of ordinary skill in the art having regard to the present disclosure. Method 500 may include additional or fewer operations than those shown and described and may be carried out or performed in a different order. Computer-readable code or instructions of the software executable by the one or more physical machines 114 or the one or more VMs 118 may be stored on a physical storage resource, such as a non-transitory computer-readable medium, of the physical storage 116 of the physical hardware resources 108.

Method 500 starts at operation 502, where the cloud cache management controller may receive multiple sets of service attributes. The cloud cache management controller may run on computing resources of a cloud. Each set of the multiple sets of service attributes may be related to a cloud cache service instance (CCSI). The multiple sets of service attributes may be all the service attributes stored in cloud cache service database 162. At operation 504, the cloud cache management controller may receive a first cloud cache management request comprising a cloud cache management operation. The cloud cache management request may comprise a cloud cache management operation.

At operation 506, the cloud cache management controller may retrieve a set of service attributes from the multiple sets of service attributes based on an evaluation of the cloud cache management operation. In one embodiment, to evaluate the cloud cache management operation, the cloud cache management controller may determine a management type of the cloud cache management operation. The management type of the cloud cache management operation may comprise one of backup, restore, or migration. Then, the cloud cache management controller may retrieve the set of service attributes of the multiple sets of service attributes based on the determined management type. The retrieved set of service attributes may be associated with a corresponding CCSI.

The retrieved set of service attributes may comprise a plurality of dimensions associated with the corresponding CCSI. Each dimension of the plurality of dimensions may correspond to a different service-level agreement (SLA) for the cloud caching service 124. The plurality of dimensions may comprise at least one of a dimension for service plans for the cloud caching service 124, a dimension for a time elapse entering a next maintenance time, a dimension for a time elapse exiting from a previous maintenance time, a dimension for an operation length projection, or a dimension for a resource consumption projection. In addition, each dimension of the plurality of dimensions may be associated with a weight and one or more service plan levels. In one embodiment, the sum of the weight associated with the each of the plurality of dimensions equals to 100%.

At operation 508, the cloud cache management controller may send the first cloud cache management request to a corresponding CCSI based on a priority value for the first cloud cache management request. The priority value may be calculated based on the retrieved set of service attributes. In one embodiment, the cloud cache management controller may calculate the priority value for the cloud cache management request based on the weight and the one or more levels associated with the each dimension of the plurality of dimensions associated with the retrieved set of service attributes.

In one embodiment, the cloud cache management controller may delay until a next maintenance time window to send the first cloud cache management request to the corresponding CCSI based on the priority value.

In another embodiment, the cloud cache management controller may order multiple cloud cache management requests based on calculated priority values associated with the respective cloud cache management requests. For example, the cloud cache management controller may receive a second cloud cache management request after receiving a first cloud cache management request. The second cloud cache management request may comprise a second cloud cache management operation. The cloud cache management controller may then retrieve a second set of service attributes from the multiple sets of service attributes based on a second evaluation of the second cloud cache management operation. Next, the cloud cache management controller may calculate a second priority value for the second cloud cache management request based on the retrieved second set of service attributes. The cloud cache management controller may order the first cloud cache management request and the second cloud cache management request based on the first priority value for the first cloud cache management request and the second priority value for the second cloud cache management request. For example, if the second priority value is higher than the first priority value, the second cloud cache management request may be placed before the first cloud cache management request. The cloud cache management controller may then send the first cloud cache management request and the second cloud cache management request to one or more corresponding cloud cache service instances based on the ordering.

Figure 6:
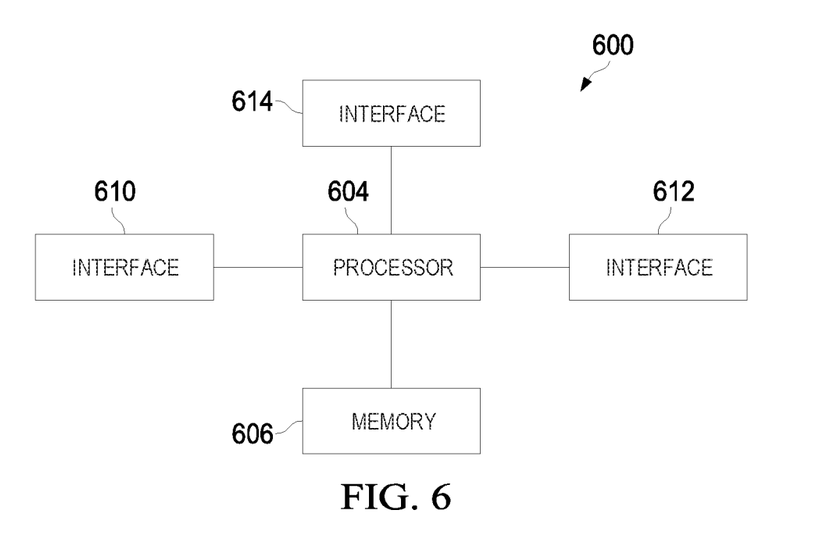
FIG. 6 is a diagram of an embodiment processing system of the cloud computing architecture of FIGS. 1A and 1B; and Corresponding numerals and symbols in the different figures generally refer to corresponding parts unless otherwise indicated. The figures are drawn to clearly illustrate the relevant aspects of the embodiments and are not necessarily drawn to scale.

FIG. 6 is a block diagram of an embodiment processing system 600 for implementing the cloud cache service system described herein, which may be a part of the physical machine 114 of the physical hardware resources 108 of the cloud 100. Although FIG. 6 depicts a single embodiment processing system, a person skilled in the art would have understood that multiple processing systems 600 may together run on one or more physical machines 114 of the physical hardware resources 108 of the cloud 100 implementing the cloud cache service system 156 in FIG. 1B and the cloud cache service system 300 in FIG. 3. As shown, the processing system 600 includes a processor 604, a memory 606, and interfaces 610-614, which may (or may not) be arranged as shown in FIG. 6. The processor 604 may be any component or collection of components adapted to perform computations and/or other processing related tasks, and the memory 606 may be any component or collection of components adapted to store programming and/or instructions for execution by the processor 604. In an embodiment, the memory 606 includes a non-transitory computer readable medium. The interfaces 610, 612, 614 may be any component or collection of components that allow the processing system 600 to communicate with other devices/components and/or a user. For example, one or more of the interfaces 610, 612, 614 may be adapted to communicate data, control, or management messages from the processor 604 to applications host by the application platform 104. As another example, one or more of the interfaces 610, 612, 614 may be adapted to allow a user or user device (e.g., personal computer (PC), smartphone, laptop computer etc.) to interact/communicate with the processing system 600. The processing system 600 may include additional components not depicted in FIG. 6, such as long term storage (e.g., non-volatile memory, etc.).

In some embodiments, the processing system 600 is included in a network device that is accessing, or part otherwise of, the one or more networks 154. In other embodiments, the processing system 600 is in a client device accessing the cloud 100 via the one or more networks 154. The client device may be a mobile communication device (e.g., a smartphone), a user equipment (UE), a personal computer (PC), a tablet, a wearable communications device (e.g., a smartwatch, etc.), or any other client device adapted to access the cloud 100 via the one or more networks 154.

As described above, the disclosed cloud cache service controller controls cloud cache management operations and shared memory spaces based on priority values. Controlling cloud cache management operations provides two main technical benefits over the conventional cloud cache service systems. First, the performance of cloud cache user operations is improved because cloud cache user operations are not impacted by the cloud cache management operations. Second, different cloud cache service instances in the same cloud cache service node can share the same shared memory space. Such sharing more efficiently utilizes resources of the cloud cache service nodes.

Although this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method, comprising:
  receiving, by a cloud cache management controller (CCMC) running on computing resources of a cloud computing system, multiple sets of service attributes, each set of the multiple sets of service attributes related to a cloud cache service instance (CCSI) of a set of CCSIs, each CCSI of the set of CCSIs corresponding to a different cloud application instance of a cloud application and storing corresponding in-memory data used by the different cloud application instance;

receiving, by the CCMC, a first cloud cache management request comprising a first cloud cache management operation;

after the receiving the first cloud cache management request, receiving, by the CCMC, a second cloud cache management request comprising a second cloud cache management operation;

retrieving, by the CCMC, a first set of service attributes from the multiple sets of service attributes based on a first evaluation of the first cloud cache management operation, wherein the first set of service attributes comprise a plurality of dimensions associated with a first corresponding CCSI of one or more CCSIs, and wherein each dimension of the plurality of dimensions is associated with one or more corresponding weights and one or more corresponding plan levels;

retrieving, by the CCMC, a second set of service attributes from the multiple sets of service attributes based on a second evaluation of the second cloud cache management operation;

calculating, by the CCMC, a first priority value for the first cloud cache management request based on a sum of products, each product of the products being based on a corresponding product of a corresponding weight and a corresponding plan level in the each dimension of the plurality of dimensions;

calculating, by the CCMC, a second priority value for the second cloud cache management request based on the second set of service attributes;

determining, by the CCMC, a forwarding procedure for the first cloud cache management request and the second cloud cache management request, the forwarding procedure including delaying the first cloud cache management request or reordering the first cloud cache management request and the second cloud cache management request based on a comparison of the first priority value and the second priority value; and sending, by the CCMC, the first cloud cache management request to one or more corresponding CCSIs based on the forwarding procedure.

2. The method of claim 1, wherein the first evaluation further comprises:
determining, by the CCMC, a management type of the first cloud cache management operation; and
retrieving, by the CCMC, the first set of service attributes of the multiple sets of service attributes based on the management type, the first set of service attributes associated with the first corresponding CCSI of the one or more CCSIs.

3. The method of claim 1, the each dimension of the plurality of dimensions corresponding to a different service-level agreement (SLA).

4. The method of claim 3, wherein the plurality of dimensions comprises at least one of a dimension for service plans, a dimension for a time elapse entering a next maintenance time, a dimension for a time elapse exiting from a previous maintenance time, a dimension for an operation length projection, or a dimension for a resource consumption projection.

5. The method of claim 1, wherein a weight sum of the one or more corresponding weights associated with the each of the plurality of dimensions equals to 100%.

6. The method of claim 1, wherein the sending comprises:
delaying, by the CCMC, until a next maintenance time window to send the first cloud cache management request to the first corresponding CCSI of the one or more CCSIs based on the first priority value and the second priority value.

7. The method of claim 1, wherein a management type of the first cloud cache management operation comprises one of backup, restore, or migration.

8. The method of claim 1, wherein the sending comprises:
sending, by the CCMC, the first cloud cache management request to the first corresponding CCSI of the one or more CCSIs on a cloud cache service node, the cloud cache service node comprising the set of CCSIs including the first corresponding CCSI, wherein the set of CCSIs on the cloud cache service node share a same memory space.

9. The method of claim 1, wherein the first priority value is calculated based on the first priority value= $Dimension_1.level \times Weight_1 + Dimension_2.level \times Weight_2 + \ldots + Dimension_N.level \times Weight_N$, wherein $Dimension_i.level$ denotes a rank of a level for $Dimension_i$, and wherein $Weight_i$ denotes a weight associated with $Dimension_i$.

10. The method of claim 1, wherein the first priority value is calculated based on the first priority value= $Dimension_1.level_1 \times Weight_1 + Dimension_1.level_2 \times Weight_1 + Dimension2.level \times Weight_2 + \ldots + Dimension_N\ level \times Weight_N$, wherein $Dimension_i.level$ denotes a rank of a level for $Dimension_i$ except for $Demention_1$, wherein $Weight_i$ denotes a weight associated with $Dimension_i$, wherein $Dimension_1.level_1$ denotes a rank of a first level for $Dimension_1$, and wherein $Dimension_1.level_2$ denotes a rank of a second level for $Dimension_1$.

11. A non-transitory computer readable medium having instructions stored thereon that, when executed by at least one computing device, cause the at least one computing device to perform operations comprising:
receiving multiple sets of service attributes, each set of the multiple sets of service attributes related to a cloud cache service instance (CCSI) of a set of CCSIs, each CCSI of the set of CCSIs corresponding to a different cloud application instance of a cloud application and storing corresponding in-memory data used by the different cloud application instance;

receiving a first cloud cache management request comprising a first cloud cache management operation;

after the receiving the first cloud cache management request, receiving a second cloud cache management request comprising a second cloud cache management operation;

retrieving a first set of service attributes from the multiple sets of service attributes based on a first evaluation of the first cloud cache management operation, wherein the first set of service attributes comprise a plurality of dimensions associated with a first corresponding CCSI of one or more CCSIs, and wherein each dimension of the plurality of dimensions is associated with one or more corresponding weights and one or more corresponding plan levels;

retrieving a second set of service attributes from the multiple sets of service attributes based on a second evaluation of the second cloud cache management operation;

calculating a first priority value for the first cloud cache management request based on a sum of products, each product of the products being based on a corresponding product of a corresponding weight and a corresponding plan level in the each dimension of the plurality of dimensions;

calculating a second priority value for the second cloud cache management request based on the second set of service attributes;

determining a forwarding procedure for the first cloud cache management request and the second cloud cache management request, the forwarding procedure including delaying the first cloud cache management request or reordering the first cloud cache management request and the second cloud cache management request based on a comparison of the first priority value and the second priority value; and sending the first cloud cache management request to one or more corresponding CCSIs based on the forwarding procedure.

12. The non-transitory computer readable medium of claim 11, wherein the first evaluation further comprises:
   determining a management type of the first cloud cache management operation; and
   retrieving the first set of service attributes of the multiple sets of service attributes based on the management type, the first set of service attributes associated with the first corresponding CCSI of the one or more CCSIs.

13. The non-transitory computer readable medium of claim 11, the each dimension of the plurality of dimensions corresponding to a different service-level agreement (SLA).

14. The non-transitory computer readable medium of claim 13, wherein the plurality of dimensions comprises at least one of a dimension for service plans, a dimension for a time elapse entering a next maintenance time, a dimension for a time elapse exiting from a previous maintenance time, a dimension for an operation length projection, or a dimension for a resource consumption projection.

15. The non-transitory computer readable medium of claim 11, wherein a weight sum of the one or more corresponding weights associated with the each of the plurality of dimensions equals to 100%.

16. The non-transitory computer readable medium of claim 11, wherein the sending comprises:
   delaying until a next maintenance time window to send the first cloud cache management request to the first corresponding CCSI of the one or more CCSIs based on the first priority value and the second priority value.

17. The non-transitory computer readable medium of claim 11, wherein a management type of the first cloud cache management operation comprises one of backup, restore, or migration.

18. The non-transitory computer readable medium of claim 11, wherein the sending comprises:
   sending the first cloud cache management request to the first corresponding CCSI of the one or more CCSIs on a cloud cache service node, the cloud cache service node comprising the set of CCSIs including the first corresponding CCSI of the one or more CCSIs, wherein the set of CCSIs on the cloud cache service node share a same memory space.

19. A computing system, comprising:
   at least one processor;
   a memory operatively coupled to the at least one processor and storing computer-readable instructions, which when executed by the at least one processor cause the computing system to perform operations comprising:
      receiving multiple sets of service attributes, each set of the multiple sets of service attributes related to a cloud cache service instance (CCSI) of a set of CCSIs, each CCSI of the set of CCSIs corresponding to a different cloud application instance of a cloud application and storing corresponding in-memory data used by the different cloud application instance;
      receiving a first cloud cache management request comprising a first cloud cache management operation;
      after the receiving the first cloud cache management request, receiving a second cloud cache management request comprising a second cloud cache management operation;
      retrieving a first set of service attributes from the multiple sets of service attributes based on a first evaluation of the first cloud cache management operation, wherein the first set of service attributes comprise a plurality of dimensions associated with a first corresponding CCSI of one or more CCSIs, and wherein each dimension of the plurality of dimensions is associated with one or more corresponding weights and one or more corresponding plan levels;
      retrieving a second set of service attributes from the multiple sets of service attributes based on a second evaluation of the second cloud cache management operation;
      calculating a first priority value for the first cloud cache management request based on a corresponding product of a corresponding weight and a corresponding plan level in the each dimension of the plurality of dimensions;
      calculating a second priority value for the second cloud cache management request based on the second set of service attributes;
      determining a forwarding procedure for the first cloud cache management request and the second cloud cache management request, the forwarding procedure including delaying the first cloud cache management request or reordering the first cloud cache management request and the second cloud cache management request based on a comparison of the first priority value and the second priority value; and
      sending the first cloud cache management request to one or more corresponding CCSIs based on the forwarding procedure.

20. The computing system of claim 19, wherein the first evaluation further comprises:
   determining a management type of the first cloud cache management operation; and
   retrieving the first set of service attributes of the multiple sets of service attributes based on the management type, the first set of service attributes associated with the first corresponding CCSI of the one or more CCSIs.

21. The computing system of claim 19, the each dimension of the plurality of dimensions corresponding to a different service-level agreement (SLA).

22. The computing system of claim 21, wherein the plurality of dimensions comprises at least one of a dimension for service plans, a dimension for a time elapse entering a next maintenance time, a dimension for a time elapse exiting from a previous maintenance time, a dimension for an operation length projection, or a dimension for a resource consumption projection.

23. The computing system of claim 19, wherein a weight sum of the one or more corresponding weights associated with the each of the plurality of dimensions equals to 100%.

24. The computing system of claim 19, wherein the sending comprises:
   delaying until a next maintenance time window to send the first cloud cache management request to the first corresponding CCSI of the one or more CCSIs based on the first priority value and the second priority value.

25. The computing system of claim 19, wherein a management type of the first cloud cache management operation comprises one of backup, restore, or migration.

26. The computing system of claim 19, wherein the sending comprises:
sending the first cloud cache management request to the first corresponding CCSI of the one or more CCSIs on a cloud cache service node, the cloud cache service node comprising the set of CCSIs including the first corresponding CCSI, wherein the set of CCSIs on the cloud cache service node share a same memory space.

27. A cloud caching service system, comprising:
a cloud cache service manager comprising:
first at least one processor;
a first memory operatively coupled to the first at least one processor and storing first computer-readable instructions, which when executed by the first at least one processor cause the cloud cache service manager to perform first operations including:
sending a first cloud cache management request comprising a first cloud cache management operation; and
after the sending the first cloud cache management request, sending a second cloud cache management request comprising a second cloud cache management operation; and
a cloud cache management controller (CCMC) comprising:
second at least one processor;
a second memory operatively coupled to the second at least one processor and storing second computer-readable instructions, which when executed by the second at least one processor cause the CCMC to perform second operations including:
receiving multiple sets of service attributes, each set of the multiple sets of service attributes related to a cloud cache service instance (CCSI) of a set of CCSIs, each CCSI of the set of CCSIs corresponding to a different cloud application instance of a cloud application and storing corresponding in-memory data used by the different cloud application instance;
retrieving a first set of service attributes from the multiple sets of service attributes based on a first evaluation of the first cloud cache management operation, wherein the first set of service attributes comprise a plurality of dimensions associated with a first corresponding CCSI of one or more CCSIs, and wherein each dimension of the plurality of dimensions is associated with one or more corresponding weights and one or more corresponding plan levels;
retrieving a second set of service attributes from the multiple sets of service attributes based on a second evaluation of the second cloud cache management operation;
calculating a first priority value for the first cloud cache management request based on the first set of service attributes based on a corresponding product of a corresponding weight and a corresponding plan level in the each dimension of the plurality of dimensions;
calculating a second priority value for the second cloud cache management request based on the second set of service attributes;
determining a forwarding procedure for the first cloud cache management request and the second cloud cache management request, the forwarding procedure including delaying the first cloud cache management request or reordering the first cloud cache management request and the second cloud cache management request based on a comparison of the first priority value and the second priority value; and
sending the first cloud cache management request to one or more corresponding CCSIs based on the forwarding procedure.

28. The cloud caching service system of claim 27, wherein the first evaluation comprises:
determining a management type of the first cloud cache management operation; and
retrieving the first set of service attributes of the multiple sets of service attributes based on the management type, the first set of service attributes associated with the first corresponding CCSI of the one or more CCSIs.

29. The cloud caching service system of claim 27, each dimension of the plurality of dimensions corresponding to a different service-level agreement (SLA).

30. The cloud caching service system of claim 29, wherein the plurality of dimensions comprises at least one of a dimension for service plans, a dimension for a time elapse entering a next maintenance time, a dimension for a time elapse exiting from a previous maintenance time, a dimension for an operation length projection, or a dimension for a resource consumption projection.

31. The cloud caching service system of claim 27, wherein a weight sum of the one or more corresponding weights associated with the each of the plurality of dimensions equals to 100%.

32. The cloud caching service system of claim 27, wherein the sending the first cloud cache management request comprises:
delaying until a next maintenance time window to send the first cloud cache management request to the first corresponding CCSI of the one or more CCSIs based on the first priority value and the second priority value.

33. The cloud caching service system of claim 27, wherein a management type of the first cloud cache management operation comprises one of backup, restore, or migration.

34. The cloud caching service system of claim 27, wherein the sending the first cloud cache management request comprises:
sending the first cloud cache management request to the first corresponding CCSI of the one or more CCSIs on a cloud cache service node, the cloud cache service node comprising the set of CCSIs including the first corresponding CCSI, wherein the set of CCSIs on the cloud cache service node share a same memory space.

* * * * *